US010156158B2

(12) United States Patent
Davis

(10) Patent No.: US 10,156,158 B2
(45) Date of Patent: Dec. 18, 2018

(54) INTEGRATED OIL SUPPLY TUBE AND CHECK VALVE

(71) Applicant: UNITED TECHNOLOGIES CORPORATION, Hartford, CT (US)

(72) Inventor: Todd A. Davis, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 351 days.

(21) Appl. No.: 15/137,690

(22) Filed: Apr. 25, 2016

(65) Prior Publication Data

US 2017/0306795 A1 Oct. 26, 2017

(51) Int. Cl.

| | |
|---|---|
| ***F02C 7/06*** | (2006.01) |
| ***F01D 25/12*** | (2006.01) |
| ***F01D 25/16*** | (2006.01) |
| ***F01D 25/18*** | (2006.01) |
| ***F16C 27/04*** | (2006.01) |
| ***F16C 33/66*** | (2006.01) |
| ***F16C 39/04*** | (2006.01) |
| ***F16C 41/00*** | (2006.01) |

(52) U.S. Cl.

CPC ......... *F01D 25/164* (2013.01); *F01D 25/125* (2013.01); *F01D 25/18* (2013.01); *F02C 7/06* (2013.01); *F16C 27/045* (2013.01); *F16C 33/6659* (2013.01); *F16C 39/04* (2013.01); *F16C 41/005* (2013.01); *F05D 2220/323* (2013.01); *F05D 2240/54* (2013.01); *F05D 2260/20* (2013.01); *F05D 2260/96* (2013.01); *F05D 2260/98* (2013.01); *F16C 2360/23* (2013.01)

(58) Field of Classification Search

CPC ...... F01D 25/164; F01D 25/125; F01D 25/18; F16C 39/04; F16C 41/005; F16C 2360/23; F05D 2220/323; F05D 2240/54; F05D 2260/20; F05D 2260/96; F05D 2260/98

See application file for complete search history.

(56) References Cited

U.S. PATENT DOCUMENTS 3,158,413 A 11/1964 Shelley
4,527,911 A * 7/1985 Davis ..................... F01D 25/18 384/471

(Continued)

FOREIGN PATENT DOCUMENTS

EP 2388444 11/2011

OTHER PUBLICATIONS

EP Search Report dated Sep. 22, 2017 in EP Application No. 17167534.1.

*Primary Examiner* — Richard A Edgar
(74) *Attorney, Agent, or Firm* — Snell & Wilmer L.L.P.

(57) ABSTRACT

An oil supply assembly for a bearing damper of a gas turbine engine includes an oil supply tube configured to supply oil in a first direction. The assembly also includes a bearing support having a bearing damper path connecting the bearing damper to the oil supply tube and a bearing compartment path connecting a bearing compartment to the oil supply tube. The assembly also includes a check valve disposed within the bearing damper path and configured to allow fluid communication in the first direction from the oil supply tube to the bearing damper and block fluid communication in a second direction opposite the first direction.

20 Claims, 6 Drawing Sheets

300 302 304 320 314 306 312 310 318 322 308

(56) References Cited

U.S. PATENT DOCUMENTS

| | | | | |
|---|---|---|---|---|
| 5,169,241 | A | 12/1992 | Singh | |
| 5,207,511 | A | 5/1993 | Bobo | |
| 8,984,853 | B2 | 3/2015 | Davis et al. | |
| 2011/0284103 | A1* | 11/2011 | Davis | F01D 5/141 137/511 |
| 2015/0219011 | A1 | 8/2015 | Muldoon | |

* cited by examiner

X'
2
10
8
6
4
26
40
38
34
18-3
36
80
14
12
32
20
24
18-2
42
44
28
B
C
22
18-1
16
X 602
662
616B
660
616A
606

602
610
616
620
606
604
660
618
608
600

INTEGRATED OIL SUPPLY TUBE AND CHECK VALVE

FIELD

The present disclosure relates to bearings of a gas turbine engine and, more particularly, to a check valve integrated to an oil supply tube.

BACKGROUND

Lubrication systems, such as those used in aircraft gas turbine engines, supply lubricant to bearings, gears and other engine components that require lubrication. The lubricant, typically oil, cools the components and protects them from wear. A typical oil lubrication system includes conventional components such as an oil tank, pump, filter and oil supply conduits.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

An oil supply assembly for a bearing damper of a gas turbine engine is disclosed. The assembly includes an oil supply tube configured to supply oil in a first direction. The assembly also includes a bearing support having a bearing damper path connecting the bearing damper to the oil supply tube and a bearing compartment path connecting a bearing compartment to the oil supply tube. The assembly also includes a check valve disposed within the bearing damper path and configured to allow fluid communication in the first direction from the oil supply tube to the bearing damper and block fluid communication in a second direction opposite the first direction.

In any of the foregoing assemblies, the oil supplied by the oil supply tube splits between the bearing damper path and the bearing compartment path at a connection point in the bearing support.

In any of the foregoing assemblies, the oil supply tube is connected to the check valve by a connector.

In any of the foregoing assemblies, the connector is located in the connection point.

In any of the foregoing assemblies, the connector comprises a ligament configured to allow oil to pass through the ligament.

In any of the foregoing assemblies, the connector is configured to allow the check valve to be removed from the bearing support when the oil supply tube is removed.

In any of the foregoing assemblies, the bearing compartment comprises oil nozzles configured to spray oil for cooling and lubricating.

A mid-turbine frame of a gas turbine engine is disclosed. The mid-turbine frame includes a bearing damper configured to reduce vibrations in the gas turbine engine. The mid-turbine frame also includes an oil supply tube configured to supply oil in a first direction to the bearing damper. The mid-turbine frame also includes a bearing support having a bearing damper path connecting the bearing damper to the oil supply tube and a bearing compartment path connecting a bearing compartment to the oil supply tube. The mid-turbine frame also includes a check valve disposed within the bearing damper path and configured to allow fluid communication in the first direction from the oil supply tube to the bearing damper and block fluid communication in a second direction opposite the first direction.

In any of the foregoing mid-turbine frames, oil supplied by the oil supply tube splits between the bearing damper path and the bearing compartment path at a connection point in the bearing support.

In any of the foregoing mid-turbine frames, the oil supply tube is connected to the check valve by a connector.

In any of the foregoing mid-turbine frames, the connector is located in the connection point.

In any of the foregoing mid-turbine frames, the connector comprises a ligament configured to allow oil to pass through the ligament.

In any of the foregoing mid-turbine frames, the connector is configured to allow the check valve to be removed from the bearing support when the oil supply tube is removed.

In any of the foregoing mid-turbine frames, the bearing compartment comprises oil nozzles configured to spray oil for cooling and lubricating.

In any of the foregoing mid-turbine frames, the bearing damper is an annular bearing damper.

An oil supply assembly for a bearing damper of a gas turbine engine is disclosed. The oil supply assembly includes a bearing damper oil supply tube configured to supply oil to the bearing damper. The oil supply assembly also includes a bearing compartment oil supply tube configured to supply oil to a bearing compartment. The oil supply assembly also includes a bearing support having a bearing damper path connecting the bearing damper to the bearing damper oil supply tube and a bearing compartment path connecting the bearing compartment to a oil supply tube. The oil supply assembly also includes a check valve disposed within the bearing damper path and configured to allow fluid communication in a first direction from the bearing damper oil supply tube to the bearing damper and block fluid communication in a second direction opposite the first direction.

In any of the foregoing assemblies, the oil supplied by the bearing damper oil supply tube is separate from the oil supplied by the bearing compartment oil supply tube.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

Figure 1:
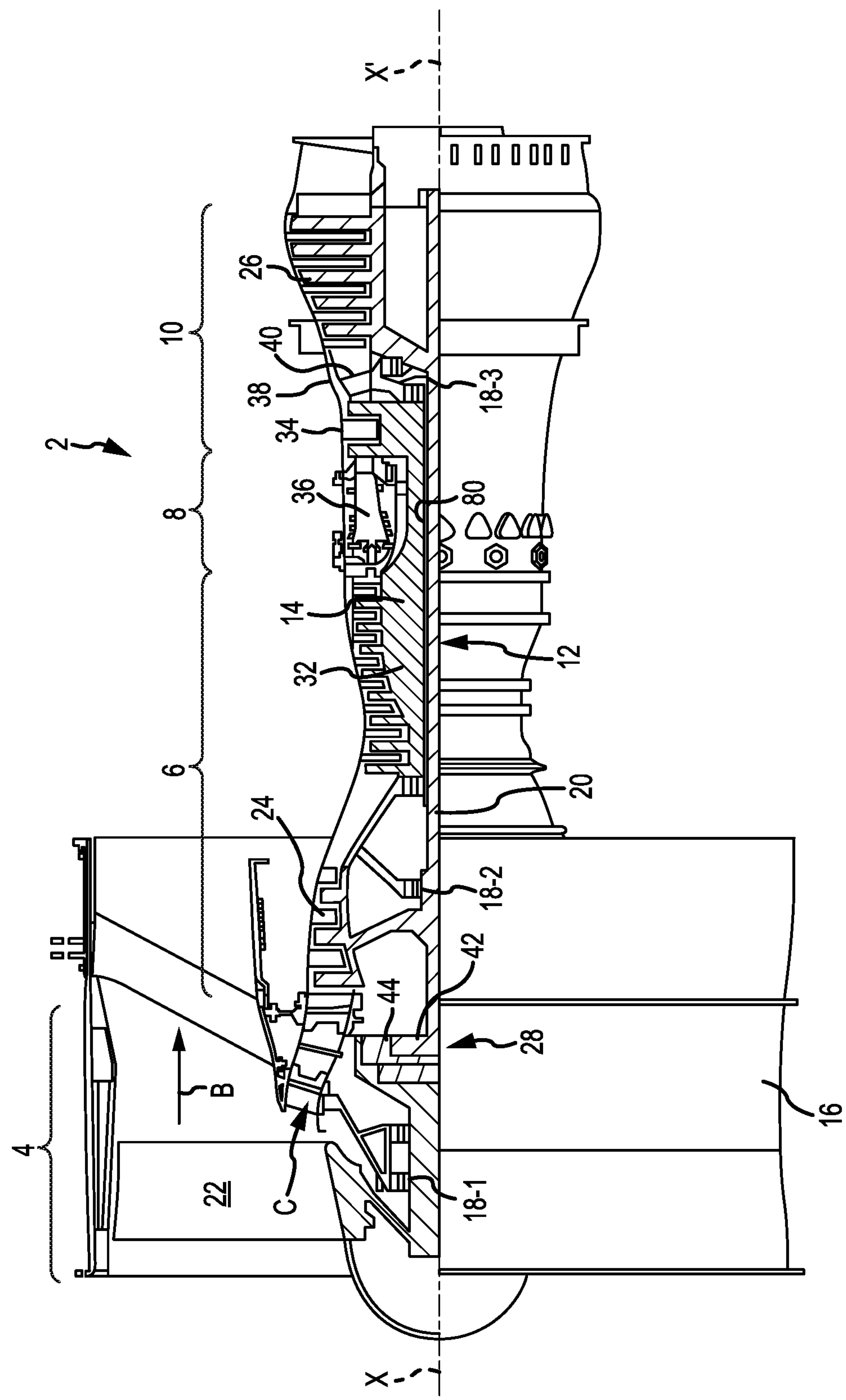
FIG. 1 is a schematic cross-section of a gas turbine engine.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that a first component is positioned at a greater distance away from the engine central longitudinal axis, than the second component. A first component that is "radially inward" of a second component means that the first component is positioned closer to the engine central longitudinal axis, than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

In various embodiments and with reference to FIG. 1, an exemplary gas turbine engine 2 is provided. Gas turbine engine 2 may be a two-spool turbofan that generally incorporates a fan section 4, a compressor section 6, a combustor section 8 and a turbine section 10. Alternative engines may include, for example, an augmentor section among other systems or features. In operation, fan section 4 can drive air along a bypass flow-path B while compressor section 6 can drive air along a core flow-path C for compression and communication into combustor section 8 then expansion through turbine section 10. Although depicted as a turbofan gas turbine engine 2 herein, it should be understood that the concepts described herein are not limited to use with turbofans as the teachings may be applied to other types of turbine engines including three-spool architectures.

Gas turbine engine 2 may generally comprise a low speed spool 12 and a high speed spool 14 mounted for rotation about an engine central longitudinal axis X-X' relative to an engine static structure 16 via several bearing systems 18-1, 18-2, and 18-3. It should be understood that various bearing systems at various locations may alternatively or additionally be provided, including for example, bearing system 18-1, bearing system 18-2, and bearing system 18-3.

Low speed spool 12 may generally comprise a low spool shaft 20 that interconnects a fan 22, a low pressure compressor section 24 (e.g., a first compressor section) and a low pressure turbine section 26 (e.g., a first turbine section). Low spool shaft 20 may be connected to fan 22 through a geared architecture 28 that can drive the fan 22 at a lower speed than low speed spool 12. Geared architecture 28 may comprise a gear assembly 42 enclosed within a gear housing 44. Gear assembly 42 couples the low spool shaft 20 to a rotating fan structure. High speed spool 14 may comprise a high spool shaft 80 that interconnects a high pressure compressor section 32 (e.g., second compressor section) and high pressure turbine section 34 (e.g., second turbine section). A combustor 36 may be located between high pressure compressor section 32 and high pressure turbine section 34. A mid-turbine frame 38 of engine static structure 16 may be located generally between high pressure turbine section 34 and low pressure turbine section 26. Mid-turbine frame 38 may support one or more bearing systems 18 (such as 18-3) in turbine section 10. Low spool shaft 20 and high spool shaft 80 may be concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C may be compressed by low pressure compressor section 24 then high pressure compressor section 32, mixed and burned with fuel in combustor 36, then expanded over high pressure turbine section 34 and low pressure turbine section 26. Mid-turbine frame 38 includes airfoils 40, which are in the core airflow path. Turbines 26, 34 rotationally drive the respective low speed spool 12 and high speed spool 14 in response to the expansion.

Gas turbine engine 2 may be, for example, a high-bypass geared aircraft engine. In various embodiments, the bypass ratio of gas turbine engine 2 may be greater than about six (6). In various embodiments, the bypass ratio of gas turbine engine 2 may be greater than ten (10). In various embodiments, geared architecture 28 may be an epicyclic gear train, such as a star gear system (sun gear in meshing engagement with a plurality of star gears supported by a carrier and in meshing engagement with a ring gear) or other gear system. Geared architecture 28 may have a gear reduction ratio of greater than about 2.3 and low pressure turbine section 26 may have a pressure ratio that is greater than about 5. In various embodiments, the bypass ratio of gas turbine engine 2 is greater than about ten (10:1). In various embodiments, the diameter of fan 22 may be significantly larger than that of the low pressure compressor section 24, and the low pressure turbine section 26 may have a pressure ratio that is greater than about 5:1. Low pressure turbine section 26 pressure ratio may be measured prior to inlet of low pressure turbine section 26 as related to the pressure at the outlet of low pressure turbine section 26 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency, which may be associated with higher pressure ratios and higher temperatures in the high speed spool 14. These higher operating temperatures and pressure ratios may create operating environments that may cause thermal loads that are higher than thermal loads conventionally encountered, which may shorten the operational life of current components. In various embodiments, operating conditions in high pressure compressor section 32 may be approximately 1400° F. (approximately 760° C.) or more, and operating conditions in combustor 36 may be higher.

In various embodiments, combustor section 8 may comprise one or more combustor 36. As mentioned, the core airflow C may be compressed, then mixed with fuel and ignited in the combustor 36 to produce high speed exhaust gases.

Figure 2B:
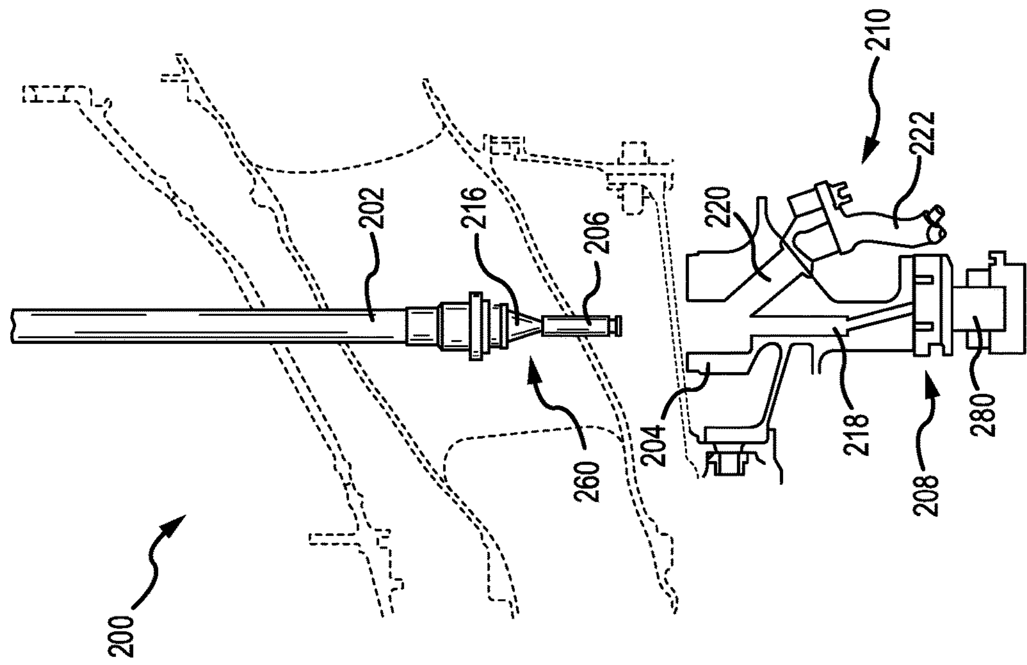
FIGS. 2A and 2B illustrate cross-sections of a turbine section with a mid-turbine frame and an oil supply tube connected to a check valve.
Figure 2A:
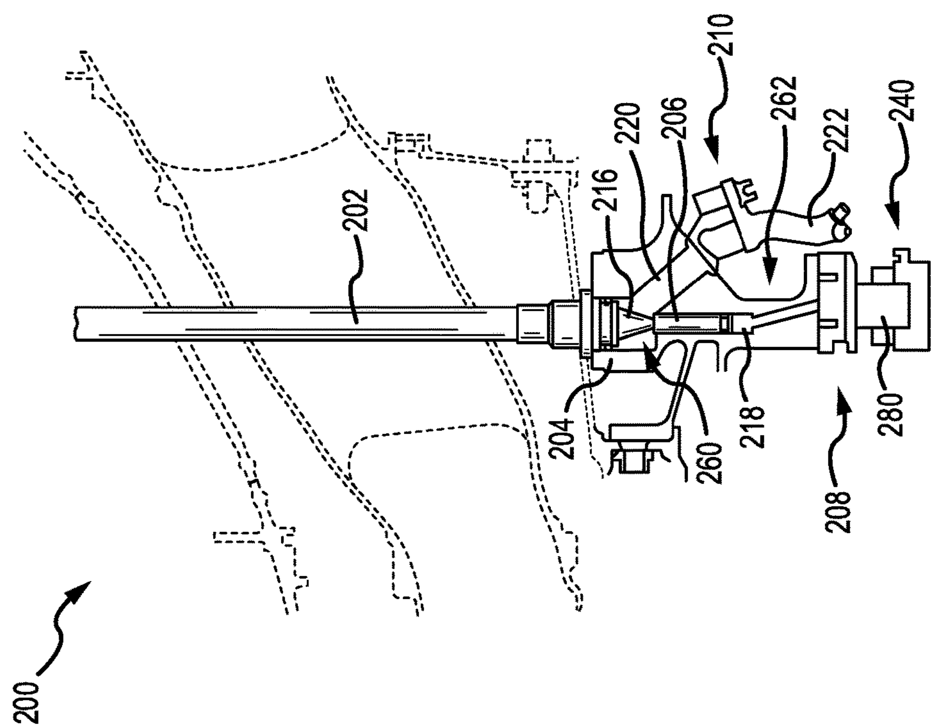

With reference to FIGS. 2A-2B, an exemplary portion 200 of mid-turbine frame 38 of gas turbine engine 2 is shown, in accordance with various embodiments. The exemplary portion 200 of mid-turbine frame 38 includes bearing support 204, bearing 280, and bearing damper 208. Bearing 280 supports the high spool shaft 80 of the gas turbine engine and bearing damper 208 absorbs vibrations from the high spool shaft 80. The exemplary portion 200 of mid-turbine frame 38 also includes an oil supply tube 202 which, as shown in FIG. 2A, is connected to bearing damper path 218 and bearing compartment path 220 and supplies oil to the bearing damper 208 and a bearing compartment 210 via the oil supply tube 202. A damper oil film is at the interface of a bearing housing and a bearing support.

The bearing compartment 210 may include an oil nozzle 222 which is configured to spray oil to cool walls 262 and bearings 280, and cool seal interfaces 240 as well as to lubricate bearings 280 within the bearing compartment and lubricate seal interfaces 240 within the bearing compartment 210.

The oil supply tube 202 is connected to a check valve 206 via a connector 260. The connector 260 has one or more ligaments 216 that attach the oil supply tube 202 to the check valve 206 and allow for fluid communication of oil to the bearing damper path 218 and the bearing compartment path 220. As shown in FIG. 2B, as the check valve 206 is connected to the oil supply tube 202 by the connector 260, the check valve 206 may be removed when the oil supply tube 202 is removed.

Figure 3:
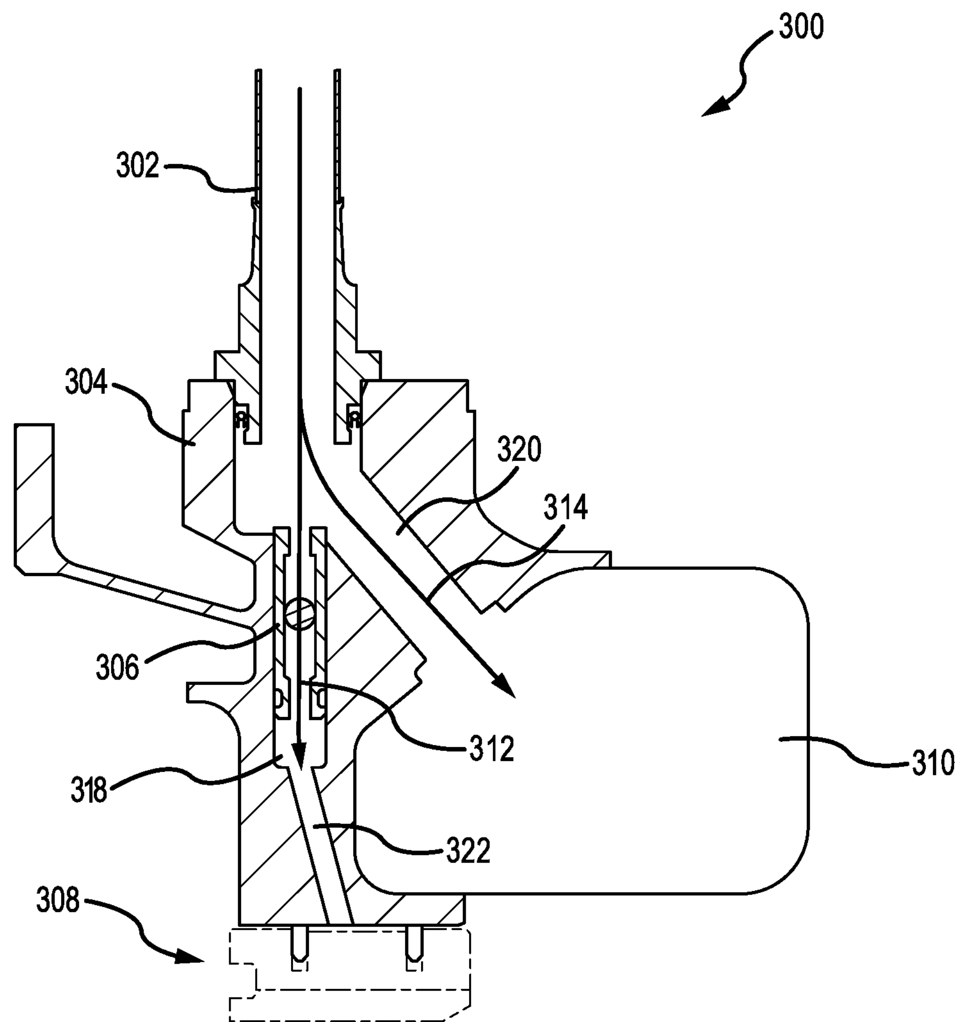
FIG. 3 is a cross section of an oil supply with a check valve.

With reference to FIG. 3, an exemplary oil supply assembly 300 is shown. Oil supply assembly 300 may be located in the mid-turbine frame 38 of the gas turbine engine 2. Oil supply assembly 300 provides oil to a bearing damper 308 via oil supply tube 302 in a bearing oil flow direction 312 through bearing damper path 318. Bearing damper 308 assists in reducing vibrations from the high spool shaft 80. The size of bearing damper 308 may be tuned based upon the rotor-dynamics of the engine system. As a result, each bearing damper 308 is highly customized to an individual engine program, in order to minimize the amount of vibration inside the engine as well as the transmissibility of that vibration and energy to mid-turbine frame cases providing structure to the mid-turbine frame 38.

The bearing damper 308 wraps around a bearing surrounding the high spool shaft 80, forming an annulus. In various embodiments, there is one oil supply tube 302 for each bearing damper 308. During operation of the bearing damper 308, oil may be continually provided for a continuous flushing of the oil so that the oil does not overheat and break down.

Oil supply assembly 300 includes a bearing support 304. Bearing support 304 includes the bearing damper path 318 and bearing compartment path 320. Bearing damper path 318 connects the oil supply tube 302 to the bearing damper 308. Bearing compartment path 320 connects the oil supply tube 302 to the bearing compartment 310. In various embodiments, the bearing damper path 318 and the bearing compartment path 320 are formed by drilling into the bearing support 304. In various embodiments, the bearing damper path 318 and the bearing compartment path 320 are formed when the bearing support 304 is fabricated.

Oil supply assembly 300 also includes a check valve 306, which allows for oil flow (or fluid communication) in bearing oil flow direction 312, but not in the opposite direction. Imbalance in the high spool shaft 80 may cause oil to become pushed into a local soft spot 322 from the bearing damper 308 in a direction opposite bearing oil flow direction 312. Oil being trapped in the local soft spot 322 may prevent a providing of oil to bearing damper 308, thereby lowering performance of the damping effect of the bearing damper 308. In various embodiments, decreasing an area where the local soft spot 322 may form (e.g., disposing the check valve 306 as close to the bearing damper 308 as possible) results in a lower likelihood of oil becoming pushed in the direction opposite bearing oil flow direction 312. When oil is pushed in a direction opposite bearing oil flow direction 312, the check valve 306 prevents oil from being backed into the oil supply tube 302. In various embodiments, the check valve 306 is a ball check valve. In various embodiments, the check valve 306 is a poppet check valve.

Oil supply tube 302 also provides oil to a bearing compartment 310 in bearing compartment oil flow direction 314 in the bearing compartment path 320. As described herein, the oil to the bearing compartment 310 feeds oil nozzles that spray oil to cool walls, to cool and lubricate bearings, to cool and lubricate seal interfaces within the bearing compartment 310.

Figure 4:
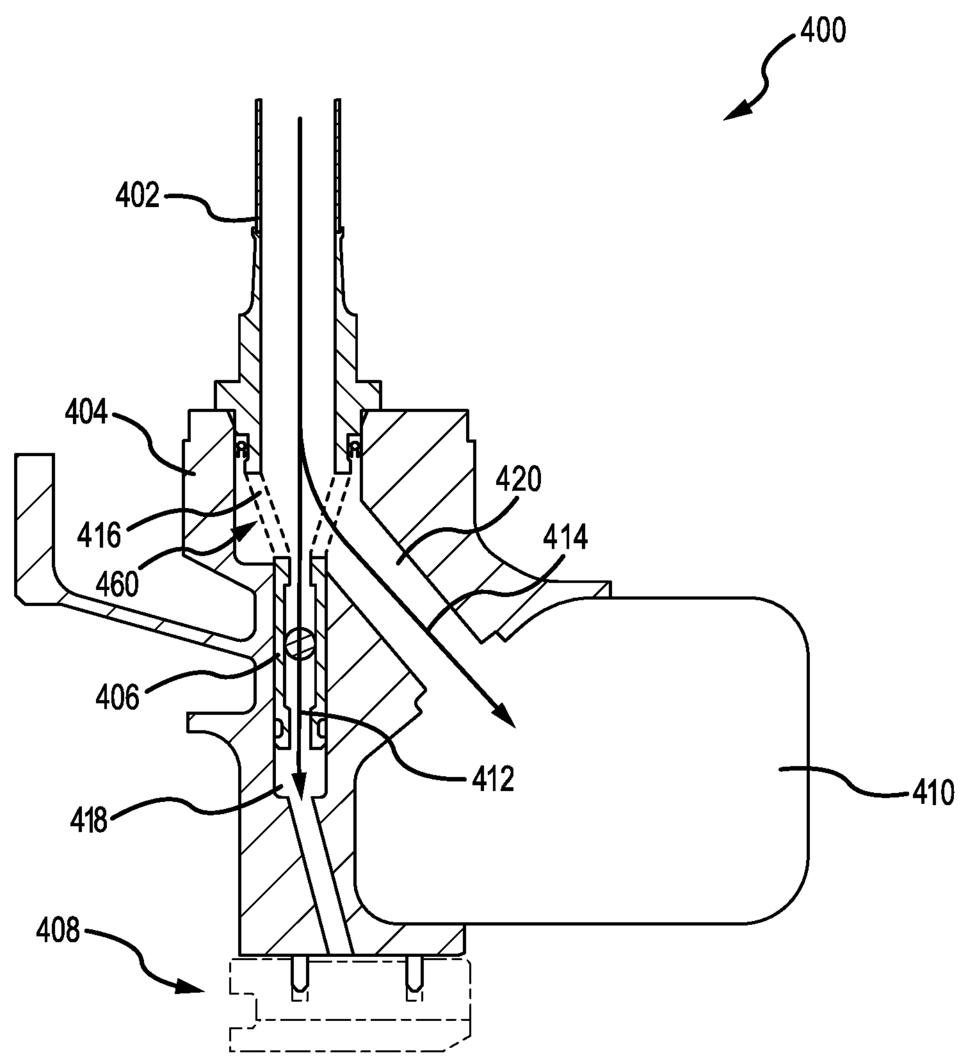
FIG. 4 is a cross section of an oil supply with a check valve connected to the oil supply tube.

Turning to FIG. 4, an oil supply assembly 400 with a check valve 406 connected to the oil supply tube 402 is shown. Oil supply assembly 400 has elements in common with oil supply assembly 300 of FIG. 3, and are numbered similarly. Oil supply assembly 400 includes oil supply tube 402, bearing support 404, check valve 406, bearing damper 408, and bearing compartment 410.

Check valve 406 may be replaced or repaired frequently, as the check valve 406 oscillates at a frequency corresponding to that of the gas turbine engine 2. Over many hours of operation, the check valve 406 may experience wear, and as the check valve 406 wears, performance of bearing damper 408 may suffer.

Oil supply assembly 400 further includes connector 460. Connector 460 is configured to connect the oil supply tube 402 with check valve 406. By connecting the oil supply tube 402 with the check valve 406, the check valve 406 is easier to access in a situation where the check valve 406 is accessed for inspection, repair, or replacement. In case of inspection, repair, or replacement of check valve 406, the oil supply tube 402 is removed and the check valve 406 is also removed as a result of being connected via connector 460, as shown in FIG. 2B. As the check valve 406 is easier to remove by being connected to the oil supply tube 402 via connector 460, performance of bearing damper 408 is optimized. In various embodiments, the gas turbine engine 2 may not be removed from a wing of the aircraft in order to access the check valve 406.

In various embodiments, the connector 460 is made of one or more ligaments 416 with windows in the one or more ligaments 416 for the oil to flow through in compartment oil flow direction 414 through bearing compartment path 420. In various embodiments, the one or more ligaments 416 allow for fluid communication in compartment oil flow direction 414. In various embodiments, the connector 460 also does not impede progress of oil (or fluid communication) from the oil supply tube 402 traveling through the check valve 406 in bearing damper oil flow direction 412 through bearing damper path 418. In various embodiments, the connector 460 is welded to the check valve 406 and the oil supply tube 402. In various embodiments, the connector 460 is connected to the check valve 406 and the oil supply tube 402 by threading or brazing.

Figure 5:
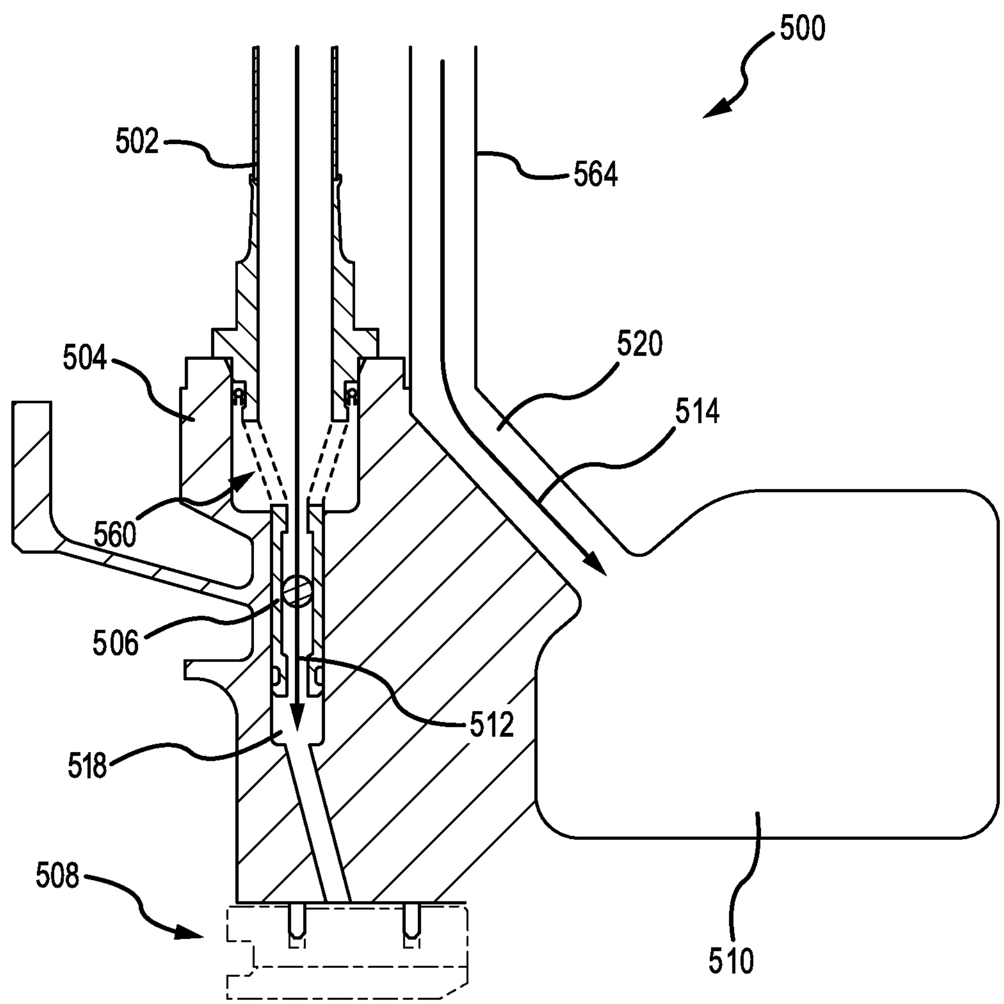
FIG. 5 is a cross section of an oil supply to a bearing damper and an oil supply to other compartments.

FIG. 5 shows a cross section of an oil supply assembly 500. Oil supply assembly 500 has elements in common with oil supply assemblies 300 of FIG. 3 and 400 of FIG. 4 and are numbered similarly. Oil supply assembly 500 includes bearing support 504, check valve 506, bearing damper 508, and bearing compartment 510.

Oil supply assembly 500 has two oil supply tubes (bearing damper oil supply tube 502 and bearing compartment oil supply tube 564). Bearing damper oil supply tube 502 provides oil (or fluid communication) to the bearing damper 508 through check valve 506 in a bearing damper oil flow direction 512 through bearing damper path 518. Bearing compartment oil supply tube 564 provides oil to the bearing compartment 510 in a compartment oil flow direction 514 through bearing compartment path 520.

In various embodiments, connector 560 is not a ligament with openings, as oil does not travel through connector 560 to reach the bearing compartment 510. Instead, the connector 560 may be any connector suitable for connecting the bearing damper oil supply tube 502 to the check valve 506 without impeding fluid communication of oil in bearing damper oil flow direction 512.

Figure 6B:
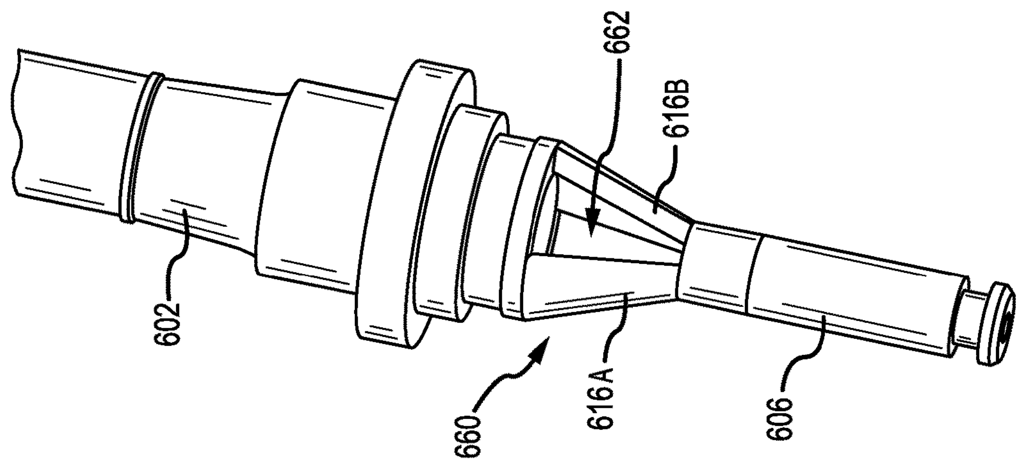
FIGS. 6A and 6B illustrate an oil supply tube connected to a check valve.
Figure 6A:
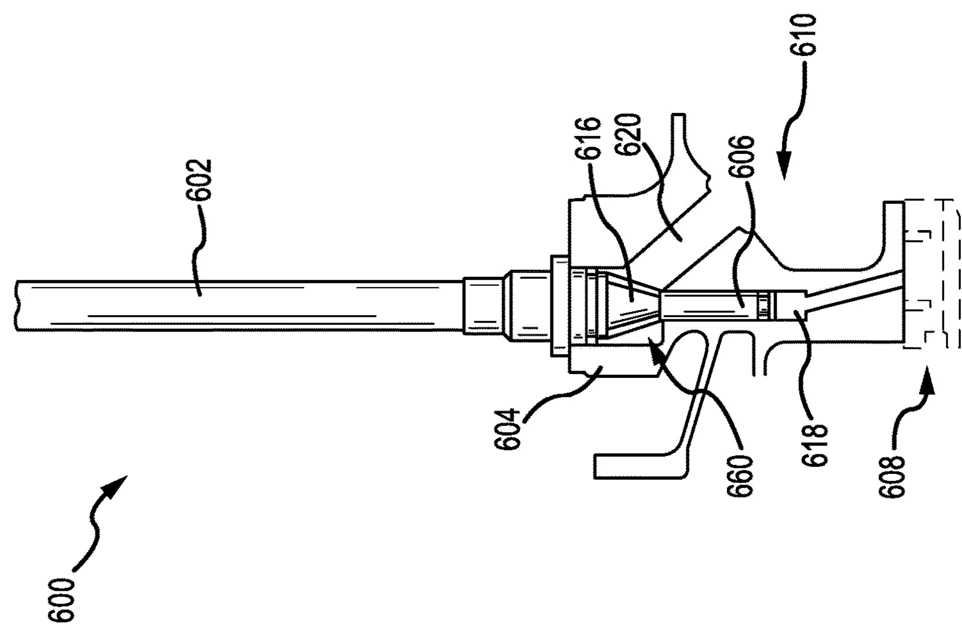

FIGS. 6A and 6B illustrate an oil supply assembly 600 and an oil supply tube 602 connected to a check valve 606 via a connector 660. Oil supply assembly 600 has elements in common with oil supply assemblies 300 of FIG. 3, 400 of FIG. 4, and 500 of FIG. 5 and are numbered similarly. Oil supply assembly 600 includes bearing support 604, check valve 606, bearing damper 608, and bearing compartment 610.

As described herein, the oil supply tube 602 provides oil for the bearing damper 608 via bearing damper path 618 and oil for the bearing compartment 610 via bearing compartment path 620. As illustrated in FIG. 6B, the connector 660 includes two ligaments 616A and 616B and oil passes from the oil supply tube 602 to the bearing compartment path 620 (and eventually to the bearing compartment 610) through an opening 662 between the ligaments 616A and 616B. While two ligaments are shown in FIG. 6B, any number of ligaments may be used in connector 660.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An oil supply assembly for a bearing damper of a gas turbine engine, comprising:

an oil supply tube configured to supply oil in a radially inward direction;

a bearing support having a bearing damper path connecting the bearing damper to the oil supply tube and a bearing compartment path connecting a bearing compartment to the oil supply tube, the bearing support being located radially inward from the oil supply tube;

a check valve disposed within the bearing damper path and configured to allow fluid communication in the radially inward direction from the oil supply tube to the bearing damper and block fluid communication in a radially outward direction;

a connector intermediate the oil supply tube and the check valve, the connector decreasing in cross-sectional area in the radially inward direction; and a conduit intermediate a radially inward end of the check valve and the bearing damper, the conduit configured to decrease oil from becoming pushed in the direction of the check valve.

2. The oil supply assembly of claim 1, wherein oil supplied by the oil supply tube splits between the bearing damper path and the bearing compartment path at a connection point in the bearing support.

3. The oil supply assembly of claim 2, wherein the oil supply tube is connected to the check valve by the connector.

4. The oil supply assembly of claim 3, wherein the connector is located in the connection point.

5. The oil supply assembly of claim 3, wherein the connector comprises a ligament configured to allow oil to pass through the ligament.

6. The oil supply assembly of claim 3, wherein the connector is configured to allow the check valve to be removed from the bearing support when the oil supply tube is removed.

7. The oil supply assembly of claim 1, wherein the bearing compartment comprises oil nozzles configured to spray oil for cooling and lubricating.

8. A mid-turbine frame of a gas turbine engine comprising:

a bearing damper configured to reduce vibrations in the gas turbine engine;

an oil supply tube configured to supply oil in a radially inward direction to the bearing damper;

a bearing support having a bearing damper path connecting the bearing damper to the oil supply tube and a bearing compartment path connecting a bearing compartment to the oil supply tube, the bearing support being located radially inward from the oil supply tube and radially outward from the bearing damper;

a check valve disposed within the bearing damper path and configured to allow fluid communication in the radially inward direction from the oil supply tube to the bearing damper and block fluid communication in a radially outward direction;

a connector intermediate the oil supply tube and the check valve, the connector decreasing in cross-sectional area in the radially inward direction; and a conduit intermediate a radially inward end of the check valve and the bearing damper, the conduit configured to decrease oil from becoming pushed in the direction of the check valve.

9. The mid-turbine frame of claim 8, wherein oil supplied by the oil supply tube splits between the bearing damper path and the bearing compartment path at a connection point in the bearing support.

10. The mid-turbine frame of claim 9, wherein the oil supply tube is connected to the check valve by the connector.

11. The mid-turbine frame of claim 10, wherein the connector is located in the connection point.

12. The mid-turbine frame of claim 10, wherein the connector comprises a ligament configured to allow oil to pass through the ligament.

13. The mid-turbine frame of claim 10, wherein the connector is configured to allow the check valve to be removed from the bearing support when the oil supply tube is removed.

14. The mid-turbine frame of claim 8, wherein the bearing compartment comprises oil nozzles configured to spray oil for cooling and lubricating.

15. The mid-turbine frame of claim 8, wherein the bearing damper is an annular bearing damper.

16. An oil supply assembly for a bearing damper of a gas turbine engine, comprising:

a bearing damper oil supply tube configured to supply oil to the bearing damper;

a bearing compartment oil supply tube configured to supply oil to a bearing compartment;

a bearing support having a bearing damper path connecting the bearing damper to the bearing damper oil supply tube and a bearing compartment path connecting the bearing compartment to the bearing compartment oil supply tube, the bearing support being located radially inward from the bearing damper oil supply tube;

a check valve disposed within the bearing damper path and configured to allow fluid communication in a radially inward direction from the bearing damper oil supply tube to the bearing damper and block fluid communication in a radially outward direction;

a connector intermediate the bearing damper oil supply tube and the check valve, the connector decreasing in cross-sectional area in the radially inward direction; and a conduit intermediate a radially inward end of the check valve and the bearing damper, the conduit configured to decrease oil from becoming pushed in the direction of the check valve.

17. The oil supply assembly of claim 16, wherein the oil supplied by the bearing damper oil supply tube is separate from the oil supplied by the bearing compartment oil supply tube.

18. The oil supply assembly of claim 16, wherein the oil supply tube is connected to the check valve by a connector.

19. The oil supply assembly of claim 18, wherein the connector comprises a plurality of ligaments configured to allow oil to pass through the ligaments.

20. The oil supply assembly of claim 18, wherein the connector is configured to allow the check valve to be removed from the bearing support when the oil supply tube is removed.

* * * * *